United States Patent
Jiang et al.

(10) Patent No.: US 11,716,121 B2
(45) Date of Patent: Aug. 1, 2023

(54) NDPA FOR MULTI-AP COORDINATED BEAMFORMING (CBF) AND MULTI-AP JOINT TRANSMISSION (JT) IN EHT

(71) Applicant: Intel Corporation, Santa Clara, CA (US)

(72) Inventors: Feng Jiang, Sunnyvale, CA (US); Qinghua Li, San Ramon, CA (US); Xiaogang Chen, Portland, OR (US); Po-Kai Huang, San Jose, CA (US); Danny Alexander, Neve Efraim Monoson (IL); Chen Kojokaro, Yoqneam Illit (IL); Assaf Gurevitz, Ramat Hasharon (IL); Ziv Avital, Kadima (IL)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 17/078,366

(22) Filed: Oct. 23, 2020

(65) Prior Publication Data

US 2021/0044333 A1  Feb. 11, 2021

Related U.S. Application Data

(60) Provisional application No. 62/926,140, filed on Oct. 25, 2019.

(51) Int. Cl.
*H04B 7/024* (2017.01)
*H04B 7/06* (2006.01)
*H04W 84/12* (2009.01)

(52) U.S. Cl.
CPC ........... *H04B 7/024* (2013.01); *H04B 7/0617* (2013.01); *H04B 7/0626* (2013.01); *H04W 84/12* (2013.01)

(58) Field of Classification Search
CPC .... H04B 7/024; H04B 7/0617; H04B 7/0626; H04B 7/0619; H04W 84/12
See application file for complete search history.

(56) References Cited

U.S. PATENT DOCUMENTS

| | | | | |
|---|---|---|---|---|
| 8,743,850 B2* | 6/2014 | Cordeiro | ............... | H04W 8/005 370/338 |
| 8,824,402 B2* | 9/2014 | Choi | ..................... | H04B 7/0617 370/329 |

(Continued)

FOREIGN PATENT DOCUMENTS

| | | | | |
|---|---|---|---|---|
| CN | 109714092 A | * | 5/2019 | ........... H04B 7/0643 |
| CN | 113965954 A | * | 1/2022 | ........... H04B 7/0643 |

(Continued)

OTHER PUBLICATIONS

Extremely High Throughput (EHT)—'IEEE_802.11be'—WikipediA (Year: 2022).*

(Continued)

*Primary Examiner* — Berhanu Tadese
(74) *Attorney, Agent, or Firm* — Schwegman Lundberg & Woessner, P.A.

(57) ABSTRACT

An access point (AP) configured for multi-AP coordinated beamforming (CBF) and multi-AP joint transmission (JT) in an Extremely High Throughput (EHT) wireless local area network (WLAN), when operating as a master AP (AP1) in a multi-AP network, is configured to encode a null data packet announcement (NDPA) frame for multi-AP channel sounding. The NDPA is configured for transmission to a second AP (AP2) and a plurality of stations (STAs) of an EHT group. The NDPA may be encoded to have an information field indicating whether a sounding sequence type is for JT channel sounding or CBF channel sounding. The NDPA may further be encoded to include fields identifying the APs participating in the channel sounding. In these (Continued)

embodiments, the channel sounding sequence for JT can be reused for the channel sounding on CBF.

20 Claims, 5 Drawing Sheets

(56) References Cited

U.S. PATENT DOCUMENTS

| | | | | |
|---|---|---|---|---|
| 8,885,512 | B2* | 11/2014 | Trainin | H04W 88/08 |
| | | | | 370/252 |
| 9,907,073 | B2* | 2/2018 | Hedayat | H04W 72/02 |
| 10,009,476 | B2* | 6/2018 | Trainin | H04W 72/1278 |
| 10,143,003 | B2* | 11/2018 | Josiam | H04L 5/0057 |
| 10,305,550 | B2* | 5/2019 | Wang | H04W 72/1273 |
| 10,349,388 | B2* | 7/2019 | Chun | H04L 1/0025 |
| 10,365,362 | B2* | 7/2019 | Jiang | G01S 13/765 |
| 10,536,932 | B2* | 1/2020 | Chun | H04L 5/0023 |
| 10,548,133 | B2* | 1/2020 | Cordeiro | H04W 28/16 |
| 10,548,146 | B2* | 1/2020 | Chun | H04W 72/0446 |
| 10,578,732 | B2* | 3/2020 | Jiang | H04W 24/10 |
| 10,656,256 | B2* | 5/2020 | Chu | H04W 64/00 |
| 10,694,499 | B2* | 6/2020 | Venkatesan | H04W 72/04 |
| 10,863,490 | B2* | 12/2020 | Chun | H04W 28/10 |
| 10,892,863 | B2* | 1/2021 | Chen | H04B 7/024 |
| 10,928,505 | B1* | 2/2021 | Chu | G01S 13/765 |
| 10,932,088 | B2* | 2/2021 | Das | H04W 4/80 |
| 10,986,600 | B1* | 4/2021 | Chu | G01S 5/021 |
| 11,050,472 | B2* | 6/2021 | Kasher | H04B 7/0639 |
| 11,064,488 | B2* | 7/2021 | Hedayat | H04W 72/0453 |
| 11,064,564 | B2* | 7/2021 | Ghosh | H04W 84/12 |
| 11,096,157 | B2* | 8/2021 | Chun | H04W 28/10 |
| 11,115,104 | B2* | 9/2021 | Huang | H04B 7/0697 |
| 11,336,487 | B1* | 5/2022 | Dakshinkar | H04L 25/0226 |
| 11,374,797 | B2* | 6/2022 | Doostnejad | H04L 25/0218 |
| 11,438,729 | B2* | 9/2022 | Das | H04W 52/242 |
| 2009/0274226 | A1 | 11/2009 | Mondal | H04L 25/03343 |
| | | | | 375/E1.001 |
| 2015/0110046 | A1* | 4/2015 | Merlin | H04B 7/0452 |
| | | | | 370/329 |
| 2017/0118764 | A1* | 4/2017 | Sutskover | H04L 5/0057 |
| 2017/0170937 | A1* | 6/2017 | Chun | H04L 5/0023 |
| 2017/0311325 | A1* | 10/2017 | Cariou | H04B 7/0617 |
| 2018/0041990 | A1* | 2/2018 | Venkatesan | H04B 7/0452 |
| 2018/0205434 | A1* | 7/2018 | Cherian | H04B 7/0452 |
| 2018/0262936 | A1* | 9/2018 | Zhou | H04J 11/0053 |
| 2018/0263043 | A1* | 9/2018 | Zhou | H04B 7/024 |
| 2018/0263044 | A1* | 9/2018 | Zhou | H04B 7/024 |
| 2018/0263045 | A1* | 9/2018 | Zhou | H04B 7/0413 |
| 2018/0292518 | A1* | 10/2018 | Chu | H04W 72/121 |
| 2018/0331749 | A1* | 11/2018 | Ghosh | H04L 1/00 |
| 2018/0359761 | A1* | 12/2018 | Chun | H04W 72/21 |
| 2019/0036583 | A1* | 1/2019 | Cherian | H04L 5/0051 |
| 2019/0041509 | A1* | 2/2019 | Jiang | H04W 24/10 |
| 2019/0045366 | A1* | 2/2019 | Vermani | H04B 7/0626 |
| 2019/0115970 | A1* | 4/2019 | Vermani | H04L 5/0023 |
| 2019/0238259 | A1* | 8/2019 | Huang | H04L 1/0009 |
| 2019/0261369 | A1* | 8/2019 | Verma | H04B 7/0619 |
| 2019/0273534 | A1* | 9/2019 | Wang | H04W 72/23 |
| 2019/0281484 | A1* | 9/2019 | Jiang | H04L 1/0026 |
| 2019/0361108 | A1* | 11/2019 | Jiang | H04W 24/10 |
| 2020/0007283 | A1* | 1/2020 | Chen | H04W 72/541 |
| 2020/0068655 | A1* | 2/2020 | Ghosh | H04W 84/12 |
| 2020/0274588 | A1* | 8/2020 | Jiang | H04B 7/0617 |
| 2020/0351988 | A1* | 11/2020 | Chen | H04W 72/0453 |
| 2020/0359248 | A1* | 11/2020 | Sadeghi | H04W 24/10 |
| 2020/0403680 | A1* | 12/2020 | Li | H04B 7/0628 |
| 2020/0404737 | A1* | 12/2020 | Cariou | H04W 48/12 |
| 2021/0014848 | A1* | 1/2021 | Davydov | H04L 5/0051 |
| 2021/0044333 | A1* | 2/2021 | Jiang | H04B 7/0619 |
| 2021/0045192 | A1* | 2/2021 | Das | H04W 76/14 |
| 2021/0112490 | A1* | 4/2021 | Cariou | H04W 88/08 |
| 2021/0144752 | A1* | 5/2021 | Chen | H04W 72/20 |
| 2021/0211178 | A1* | 7/2021 | Moon | H04B 7/0617 |
| 2021/0274378 | A1* | 9/2021 | Chen | H04W 48/14 |
| 2021/0274574 | A1* | 9/2021 | Ghosh | H04W 48/12 |
| 2021/0321293 | A1* | 10/2021 | Chen | H04L 27/2603 |
| 2021/0336752 | A1* | 10/2021 | Kwon | H04L 1/0026 |
| 2021/0337537 | A1* | 10/2021 | Chun | H04W 4/70 |
| 2021/0345401 | A1* | 11/2021 | Lopez-Perez | H04W 74/0808 |
| 2022/0029735 | A1* | 1/2022 | Chen | H04L 1/0013 |
| 2022/0038241 | A1* | 2/2022 | Vermani | H04L 5/0055 |
| 2022/0140879 | A1* | 5/2022 | Liang | H04W 24/10 |
| | | | | 375/267 |
| 2022/0182119 | A1* | 6/2022 | Ravichandran | H04B 7/0626 |
| 2022/0321301 | A1* | 10/2022 | Yu | H04L 5/0051 |
| 2022/0345188 | A1* | 10/2022 | Liu | H04L 5/0053 |

FOREIGN PATENT DOCUMENTS

| | | | | |
|---|---|---|---|---|
| DE | 112016005032 | T5* | 7/2018 | H04B 7/0695 |
| EP | 3133757 | A1* | 2/2017 | H04L 1/0025 |
| EP | 3133762 | B1* | 1/2020 | H04L 1/0025 |
| EP | 3667999 | A1* | 6/2020 | H04L 1/0025 |
| EP | 3849099 | A1* | 7/2021 | H04B 7/0643 |
| EP | 3667999 | B1* | 8/2021 | H04L 1/0025 |
| EP | 4064781 | A1* | 9/2022 | H04B 17/309 |
| WO | WO-2014074919 | A1* | 5/2014 | H04B 7/024 |
| WO | WO-2015057772 | A1* | 4/2015 | H04B 7/024 |
| WO | WO-2015199306 | A1* | 12/2015 | H04L 1/0001 |
| WO | WO-2016111838 | A1* | 7/2016 | H04B 7/024 |
| WO | WO-2016167609 | A1* | 10/2016 | H04L 1/0025 |
| WO | WO-2017030295 | A1* | 2/2017 | H04L 1/0025 |
| WO | WO-2017030297 | A1* | 2/2017 | H04B 7/0643 |
| WO | WO-2017065580 | A1* | 4/2017 | H04B 17/24 |
| WO | WO-2017078803 | A1* | 5/2017 | H04B 7/0695 |
| WO | WO-2018101984 | A1* | 6/2018 | H04L 1/0026 |
| WO | WO-2018111343 | A1* | 6/2018 | H04B 7/26 |
| WO | WO-2018136216 | A1* | 7/2018 | H04B 7/024 |
| WO | WO-2018156229 | A1* | 8/2018 | H04B 7/0643 |
| WO | WO-2018169799 | A1* | 9/2018 | H04B 17/318 |
| WO | WO-2018169800 | A1* | 9/2018 | H04B 7/024 |
| WO | WO-2018169801 | A1* | 9/2018 | H04B 7/024 |
| WO | WO-2018169803 | A1* | 9/2018 | H04B 7/26 |
| WO | WO-2018187725 | A1* | 10/2018 | G01S 11/02 |
| WO | WO-2019028265 | A1* | 2/2019 | H04B 7/024 |
| WO | WO-2019074927 | A1* | 4/2019 | H04B 7/0691 |
| WO | WO-2019153756 | A1* | 8/2019 | H04W 28/16 |
| WO | WO-2019161189 | A1* | 8/2019 | H04B 7/0617 |
| WO | WO-2021129401 | A1* | 7/2021 | H04B 17/309 |
| WO | WO-2021239143 | A1* | 12/2021 | H04B 7/0643 |
| WO | WO-2022001713 | A1* | 1/2022 | H04B 7/06 |
| WO | WO-2022026808 | A1* | 2/2022 | H04L 5/0053 |
| WO | WO-2022051408 | A1* | 3/2022 | H04B 7/0643 |
| WO | WO-2022125450 | A1* | 6/2022 | H04B 7/0617 |
| WO | WO-2022149316 | A1* | 7/2022 | |
| WO | WO-2022150128 | A1* | 7/2022 | |
| WO | WO-2022176326 | A1* | 8/2022 | |
| WO | WO-2022203361 | A1* | 9/2022 | |
| WO | WO-2022226298 | A1* | 10/2022 | |
| WO | WO-2022228640 | A1* | 11/2022 | |
| WO | WO-2022232578 | A1* | 11/2022 | |

OTHER PUBLICATIONS

Tsatsomeros, Michael, "Lecture Notes on Matrices with Positive Principal Minors: Theory and Applications", Indian Institute of Technology—Madras, (Dec. 16, 2017), 31 pgs.

* cited by examiner

NDPA FRAME FORMAT

| FRAME CONTROL | DURATION | RA | TA | SOUNDING DIALOG TOKEN | COMMON INFO FIELD | AP INFO 1 | ... | AP INFO m | STA INFO 1 | ... | STA INFO n | FCS |
|---|---|---|---|---|---|---|---|---|---|---|---|---|

FIG. 4

TRIGGER FRAME FORMAT

| FRAME CONTROL | DURATION | RA | TA | COMMON INFO FIELD | USER INFO 1 | ... | USER INFO m | PADDING | FCS |
|---|---|---|---|---|---|---|---|---|---|

FIG. 5

NDPA FOR MULTI-AP COORDINATED BEAMFORMING (CBF) AND MULTI-AP JOINT TRANSMISSION (JT) IN EHT

PRIORITY CLAIM

This application claims priority under 35 USC 119(e) to U.S. Provisional Patent Application Ser. No. 62/926,140, filed Oct. 25, 2019 [reference number AC5944-Z] which is incorporated herein by reference in its entirety.

TECHNICAL FIELD

Embodiments pertain to wireless communications. Some embodiments relate to wireless local area networks (WLANs). Some embodiments relate to WLAN communications in accordance with the IEEE 802.11be draft standard (i.e., Extremely High Throughput (EHT)). Some embodiments relate to multi-AP coordinated beamforming (CBF) and multi-AP joint transmission (JT) in EHT.

BACKGROUND

One issue with multi-AP coordinated beamforming (CBF) and multi-AP joint transmission (JT) in EHT is that the access points need different channel state information for CBF than for JT.

BRIEF DESCRIPTION OF THE DRAWINGS

FIG. 4 illustrates an null-data packet announcement (NDPA) frame in accordance with some embodiments.

FIG. 5 illustrates a trigger frame in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
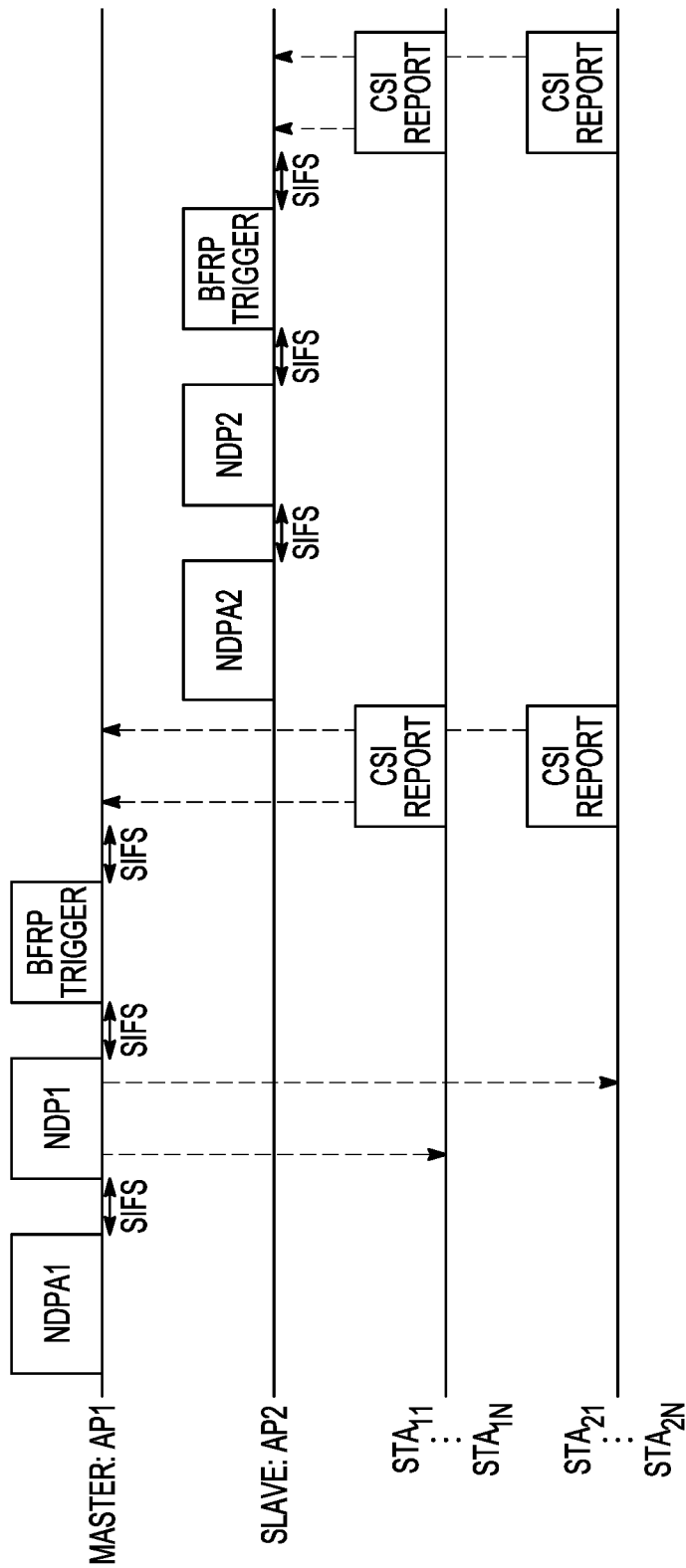
FIG. 1 illustrates a sounding sequence for CBF in accordance with some embodiments.
Figure 2:
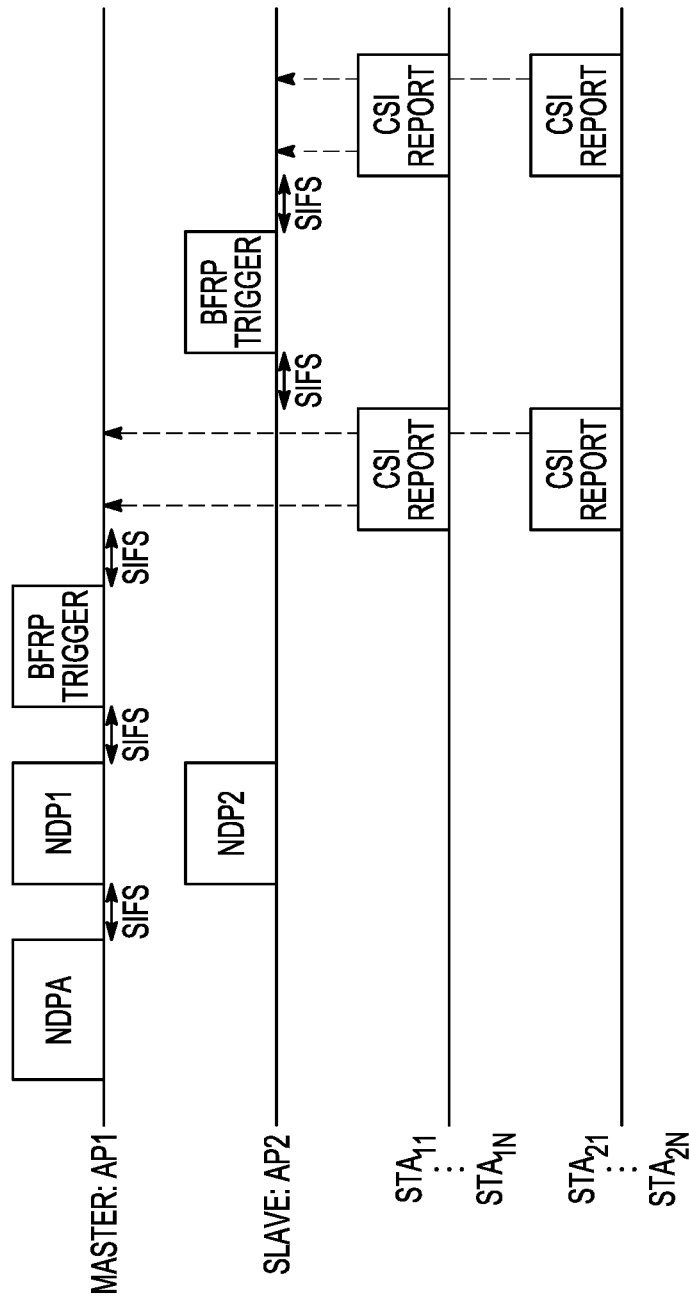
FIG. 2 illustrates a sounding sequence for JT in accordance with some embodiments.
Figure 3:
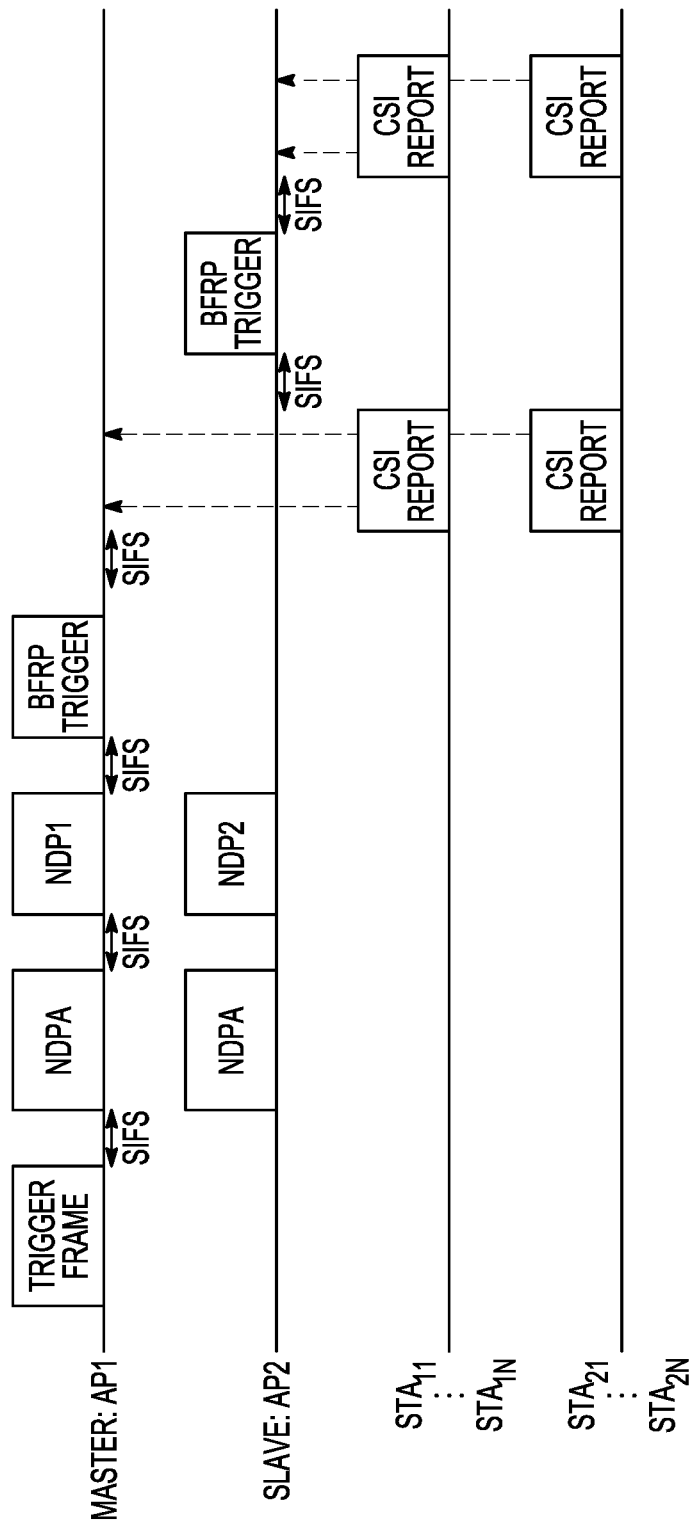
FIG. 3 illustrates a sounding sequence for JT in accordance with some embodiments.

In the development of EHT project, the multi-AP coordinated beamforming (CBF) and multi-AP joint transmission (JT) have been proposed. The sounding sequence in FIG. 1 is proposed for CBF, and in this sequence the IEEE 802.11ax sounding protocol may be used for simplicity. The two sounding sequences in FIG. 2 and FIG. 3 are proposed for channel sounding for JT in an EHT group. After this channel sounding sequence, both of master AP and slave AP may obtain a CSI report from STA. This CSI report may be calculated based on the NDP1 and NDP2. For the CBF, the AP may also need to know the CSI from a STA to design the beamforming vectors for the STA, and with minor revisions, the channel sounding sequence for JT may be reused for the channel sounding of CBF. In accordance with these embodiments disclosed herein, the JT channel sounding sequence may be reused for CBF.

In some of these embodiments, an indication field may be included in an NDPA frame or trigger frame to indicate the purpose of channel sounding sequence, for example, JT or CBF. In some embodiments, the reuse of the JT channel sounding sequence to support CBF may reduce implementation complexity.

In JT, the master AP and slave AP need to know the joint channel info between master AP/slave AP and STA, and the STA needs to prepare a CSI report based on the combined NDP1 and NDP2. For example, the STA needs to calculate the SVD of the big channel matrix obtained from NDP1 and NDP2. Assume master AP sends 8 spatial streams in NDP1 and slave AP sends 4 spatial streams in NDP2, and the STA has four Rx antennas, then the STA needs to prepare the CSI report based on the 4×12 channel matrix on single subcarrier.

In CBF, each AP may only need to know the peer-to-peer channel info between multi-AP and STA. In these embodiments, to reuse the JT sounding sequence, the STA prepares CSI report based on NDP1 and NDP2 separately. For example, using the same assumption for the JT case, for the CSI report on a single subcarrier, each STA calculate the CSI for master AP based on the 4×8 channel matrix, and calculate the CSI for slave AP based on the 4×4 channel matrix.

Since the CSI report format of JT and CBF are different, some embodiments disclosed herein may use an NDPA frame (illustrated in FIG. 4) in the sounding sequences illustrated in FIGS. 1, 2 and 3 to indicate the CSI report format, while other embodiments, disclosed herein may use a trigger frame (illustrated in FIG. 5) in the sounding sequence illustrated in FIG. 3 to indicate the CSI report format.

In some embodiments, the common info field of the NDPA frame may indicate the sounding sequence type, JT or CBF, and may also indicate how many AP are joining this sounding sequence and each AP's ID info, for example, BSSID or other ID. The common info field may reuse the format of the STA info field but with a special AID value for differentiation and with a redefinition of information bits. For an NDPA frame use in FIG. 1, it may include a single AP info field or the AP info field may not exist. In the AP info field, each AP may indicate the number of spatial streams that will be transmitted and the mapping with the P-matrix. For example, AP1 may use the first 4 columns or rows of an 8×8 P matrix to send first four spatial streams and AP2 may use the second 4 columns or rows of the 8×8 P matrix to send second four spatial streams. Also, each AP may indicate whether it will send a BFRP trigger frame to solicit CSI reports from STAs and if the AP may exchange CSI reports using a backhaul or a front haul channel. In these embodiments, some AP would not need to transmit a BFRP trigger to solicit CSI from the STAs. In some embodiments, the AP info field may also reuse the format of STA info field, but the AID value will be replaced with the part of BSSID (LSB bits) of AP or other ID of AP. In some embodiments, to further simplify the design, the information in common info field may be combined into AP info field.

In some embodiments, an indication field may also be added to the STA info field. For example, each STA info field may carry an indication field and this indication field may indicates whether this sounding sequence is for JT or CBF. The responding STA may prepare a CSI report accordingly.

In some embodiments, a trigger frame may be used, such as the trigger frame illustrated in FIG. 3. In some of these embodiments, the trigger frame format of IEEE 802.11ax may be re-used. In some embodiments, in the trigger type subfield of common info field, a new type of trigger frame may be defined for the multi-AP channel sounding sequence and in the trigger dependent common info field, a sub trigger type may be defined to further differentiate the channel sounding sequence, for example, JT or CBF. In some embodiments, in the common info field the master AP may indicate the type of the following sounding sequence, JT or CBF. Each user info field may list the info of the APs that will join this channel sounding sequence. In these embodiments, number of spatial streams that will be transmitted in an NDP frame and the spatial stream allocation information for each AP may also be indicated.

Some embodiments are directed to an access point (AP) configured for multi-AP coordinated beamforming (CBF) and multi-AP joint transmission (JT) in an Extremely High Throughput (EHT) wireless local area network (WLAN). In some embodiments, when the AP is operating as a first AP (AP1) in a multi-AP network, the AP1 is configured to: encode a null data packet announcement (NDPA) frame for multi-AP channel sounding, the NDPA for transmission to a second AP (AP2) and a plurality of stations (STAs) of an EHT group. The NDPA may be encoded to have an information field indicating whether a sounding sequence type in the NDP1 and NDP2 is for JT channel sounding or CBF channel sounding. The NDPA may further be encoded to include fields identifying APs participating in the channel sounding including the AP1 and the AP2. In these embodiments, the AP1 may encode a first null data packet (NDP1) for transmission to the STAs of the EHT group. The NDP1 is to be transmitted concurrently with a second null data packet (NDP2) from the AP2. In some embodiments, the NDP1 and the NPD2 may comprise sounding sequences for either the JT channel sounding or the CBF channel sounding. In some embodiments, the NDP1 and the NPD2 may be transmitted via a plurality of spatial streams.

In these embodiments, the AP1 may decode a channel state information (CSI) report frame receive from each STA of the EHT group. Each CSI report frame may include channel state information determined by one of the STAs of the EHT group based on both the NDP1 and the NDP2. For the CBF channel sounding, the CSI reports may be determined by the STAs separately for the NDP1 and the NDP2 (i.e., the CSI reports represent the individual channel). For the JT channel sounding, the CSI reports may be determined by the STAs from a combined reception of the NDP1 and the NDP2 (i.e., the CSI reports represent the joint channel). In these embodiments, the channel sounding sequence for JT can be reused for the channel sounding on CBF.

In some embodiments, the NDPA frame may further be encoded to indicate whether the AP1 will transmit a beamforming refinement phase (BFRP) trigger frame solicit the CSI report from each of the STAs. When the NDPA is encoded to indicate that the AP1 will transmit the BFRP trigger frame, the AP1 may also encode the BFRP trigger frame for transmission a short inter-frame spacing (SIFS) after the NDP1 to the STAs of the EHT group to solicit the CSI report from each of the STAs.

In some embodiments, for the CBF channel sounding, the AP1 may also determine beamforming vectors based on the CSI reports.

In some embodiments, the fields identifying APs participating in the channel sounding may comprise AP information fields and the AP information fields may further include a number of spatial streams to be transmitted by each of the APs participating in the channel sounding.

In some embodiments, the AP information fields may further include a mapping between the spatial streams and a P-matrix (i.e., a complex square matrix), for use by the STAs is performing a singular value decomposition (SVD) on a channel matrix obtained from the NDP1 and the NDP2.

In some embodiments, the AP information fields may further indicate whether each AP will transmit the BFRP trigger frame to solicit CSI reports from the STAs or whether an AP is able to receive a CSI report from another AP over a backhaul or front-haul channel. In these embodiments, if an AP is able to receive a CSI report from another AP over a backhaul or front-haul channel, it may not need to transmit a BFRP trigger frame to solicit CSI reports from the STAs.

In some embodiments, the information field may indicate whether the sounding sequence type is for the JT channel sounding or the CBF channel sounding is a common information field.

In some embodiments, the NDPA frame may further be encoded to include a STA information fields for each of the STAs of the EHT group. Each STA information field may be encoded to include an indicator indicating whether the sounding sequence type, for an associated STA of the EHT group, is for the JT channel sounding or the CBF channel sounding.

In some embodiments, the NDPA frame may be a trigger frame (rather than an NDPA frame) having a trigger type subfield indicating multi-AP channel sounding. The trigger frame may trigger transmission of an NDPA by both the AP1 and AP2. These embodiments are illustrated in FIG. 3

In some embodiments, the AP1 further comprising a plurality of antennas configured for transmitting the plurality of spatial streams of the NDP1.

Some embodiments are directed to a station (STA) configured for multi-AP coordinated beamforming (CBF) and multi-AP joint transmission (T) in an Extremely High Throughput (EHT) wireless local area network (WLAN). In these embodiments, the STA may decode a null data packet announcement (NDPA) frame for multi-AP channel sounding. The NDPA may be received from an access point operating as a first AP (AP1) in a multi-AP network that includes a second AP (AP2) and one or more other stations (STAs) of an EHT group. The NDPA may have an information field indicating whether a sounding sequence type is for JT channel sounding or CBF channel sounding. The NDPA may further include fields identifying APs participating in the channel sounding including the AP1 and the AP2. In these embodiments, the STA may decode a first null data packet (NDP1) received from the AP1 and a second null data packet (NDP2) from the AP2. The NDP1 and the NPD2 may comprise sounding sequences for either the JT channel sounding or the CBF channel sounding. The NDP1 and the NPD2 may be received via a plurality of spatial streams. In these embodiments, the STA may encode a channel state information (CSI) report frame for transmission to the AP1. The CSI report frame may include channel state information determined by the STA based on both the NDP1 and the NDP2.

For the CBF channel sounding, the CSI report may be determined by the STA separately for the NDP1 and the NDP2 (i.e., the CSI reports represent the individual channel). For the JT channel sounding, the CSI report is determined by the STA from a combined reception of the NDP1 and the NDP2 (i.e., the CSI reports represent the joint channel).

In some embodiments, the APs and STA may be configured to operate in accordance with one or more of the IEEE 802.11 standards. IEEE P802.11ax/D4.3 (August 2019) is incorporated herein by reference.

Figure 6:
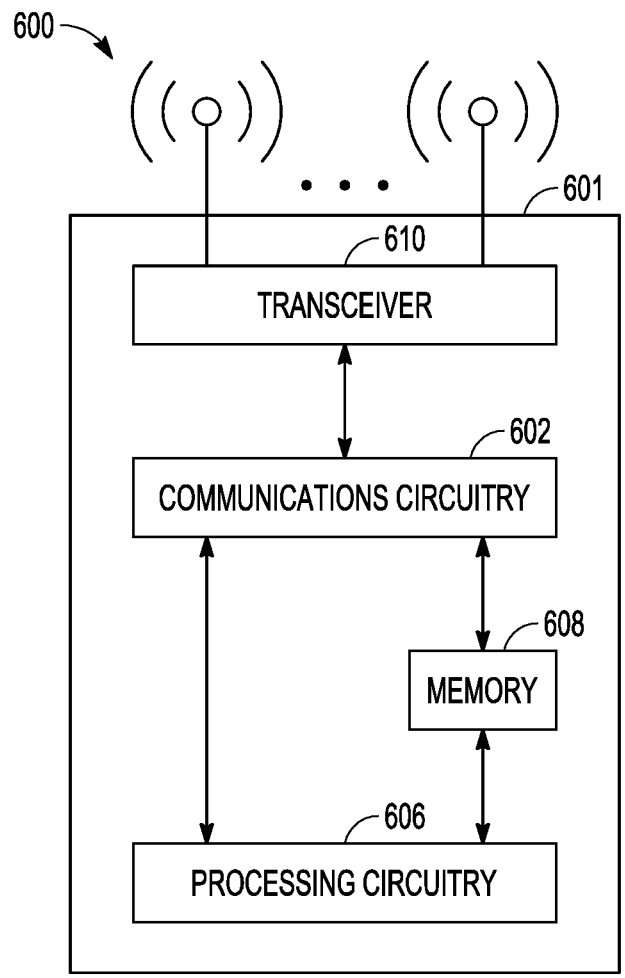
FIG. 6 illustrates a function block diagram of a station (STA) in accordance with some embodiments.

In one embodiment, FIG. 6 illustrates a functional block diagram of a communication station that may be suitable for use as an AP STA or a non-AP STA in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen. Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) configured for multi-AP coordinated beamforming (CBF) and multi-AP joint transmission (JT) in an Extremely High Throughput (EHT) wireless local area network (WLAN), the apparatus comprising: processing circuitry and memory,
   wherein when the AP is operating as a master AP (AP1) in a multi-AP network, the processing circuitry is configured to:
   encode a null data packet announcement (NDPA) frame for multi-AP channel sounding, the NDPA for transmission to a second AP (AP2) and a plurality of stations (STAs) of an EHT group, the NDPA encoded to have an information field indicating whether a sounding sequence type is for JT channel sounding or CBF channel sounding, the NDPA further encoded to include fields identifying APs participating in the channel sounding including the AP1 and the AP2;
   encode a first null data packet (NDP1) for transmission to the STAs of the EHT group, the NDP1 to be transmitted concurrently with a second null data packet (NDP2) from the AP2, the NDP1 and the NPD2 comprising sounding sequences for either the JT channel sounding or the CBF channel sounding, the NDP1 and the NPD2 transmitted via a plurality of spatial streams; and
   decode a channel state information (CSI) report frame receive from each STA of the EHT group, wherein each CSI report frame includes channel state information determined by one of the STAs of the EHT group based on both the NDP1 and the NDP2, wherein for the CBF channel sounding, the CSI reports are determined by the STAs separately for the NDP1 and the NDP2, and wherein for the JT channel sounding, the CSI reports are determined by the STAs from a combined reception of the NDP1 and the NDP2.

2. The apparatus of claim 1, wherein the NDPA frame is further encoded to indicate whether the AP1 will transmit a beam-forming refinement phase (BFRP) trigger frame solicit the CSI report from each of the STAs, and wherein when the NDPA is encoded to indicate that the AP1 will transmit the BFRP trigger frame, the processing circuitry is further configured to:

encode the BFRP trigger frame for transmission a short inter-frame spacing (SIFS) after the NDP1 to the STAs of the EHT group to solicit the CSI report from each of the STAs.

3. The apparatus of claim 2, wherein for the CBF channel sounding, the processing circuitry is further configured to determine beamforming vectors based on the CSI reports.

4. The apparatus of claim 3, wherein the fields identifying APs participating in the channel sounding comprise AP information fields, and wherein the AP information fields further include a number of spatial streams to be transmitted by each of the APs participating in the channel sounding.

5. The apparatus of claim 4, wherein the AP information fields further include a mapping between the spatial streams and a P-matrix, for use by the STAs is performing a singular value decomposition (SVD) on a channel matrix obtained from the NDP1 and the NDP2, and wherein the P-matrix is a complex square matrix having positive principal minors.

6. The apparatus of claim 5, wherein the AP information fields further indicate whether each AP will transmit the BFRP trigger frame to solicit CSI reports from the STAs or whether an AP is able to receive a CSI report from another AP over a backhaul.

7. The apparatus of claim 1, wherein the information field indicating whether the sounding sequence type is for the JT channel sounding or the CBF channel sounding is a common information field.

8. The apparatus of claim 1, wherein the NDPA frame is further encoded to include a STA information fields for each of the STAs of the EHT group, wherein each STA information field is encoded to include an indicator indicating whether the sounding sequence type, for an associated STA of the EHT group, is for the JT channel sounding or the CBF channel sounding.

9. The apparatus of claim 1, wherein the NDPA frame is a trigger frame having a trigger type subfield indicating multi-AP channel sounding, the trigger frame to trigger transmission of an NDPA by both the AP1 and AP2.

10. The apparatus of claim 1, wherein the AP1 further comprising a plurality of antennas configured for transmitting the plurality of spatial streams of the NDP1, and wherein the memory is configured to store the NDP1.

11. A non-transitory computer-readable storage medium that stores instructions for execution by processing circuitry of an access point (AP) configured for multi-AP coordinated beamforming (CBF) and multi-AP joint transmission (JT) in an Extremely High Throughput (EHT) wireless local area network (WLAN), wherein when the AP is operating as a master AP (AP1) in a multi-AP network, the instruction configure the processing circuitry to:

encode a null data packet announcement (NDPA) frame for multi-AP channel sounding, the NDPA for transmission to a second AP (AP2) and a plurality of stations (STAs) of an EHT group, the NDPA encoded to have an information field indicating whether a sounding sequence type is for JT channel sounding or CBF channel sounding, the NDPA further encoded to include fields identifying APs participating in the channel sounding including the AP1 and the AP2;

encode a first null data packet (NDP1) for transmission to the STAs of the EHT group, the NDP1 to be transmitted concurrently with a second null data packet (NDP2) from the AP2, the NDP1 and the NPD2 comprising sounding sequences for either the JT channel sounding or the CBF channel sounding, the NDP1 and the NPD2 transmitted via a plurality of spatial streams; and decode a channel state information (CSI) report frame receive from each STA of the EHT group, wherein each CSI report frame includes channel state information determined by one of the STAs of the EHT group based on both the NDP1 and the NDP2, wherein for the CBF channel sounding, the CSI reports are determined by the STAs separately for the NDP1 and the NDP2, and wherein for the JT channel sounding, the CSI reports are determined by the STAs from a combined reception of the NDP1 and the NDP2.

12. The non-transitory computer-readable storage medium of claim 11, wherein the NDPA frame is further encoded to indicate whether the AP1 will transmit a beam-forming refinement phase (BFRP) trigger frame solicit the CSI report from each of the STAs, and wherein when the NDPA is encoded to indicate that the AP1 will transmit the BFRP trigger frame, the processing circuitry is further configured to:

encode the BFRP trigger frame for transmission a short inter-frame spacing (SIFS) after the NDP1 to the STAs of the EHT group to solicit the CSI report from each of the STAs.

13. The non-transitory computer-readable storage medium of claim 12, wherein for the CBF channel sounding, the processing circuitry is further configured to determine beamforming vectors based on the CSI reports.

14. The non-transitory computer-readable storage medium of claim 13, wherein the fields identifying APs participating in the channel sounding comprise AP information fields, and wherein the AP information fields further include a number of spatial streams to be transmitted by each of the APs participating in the channel sounding.

15. The non-transitory computer-readable storage medium of claim 14, wherein the AP information fields further include a mapping between the spatial streams and a P-matrix, for use by the STAs is performing a singular value decomposition (SVD) on a channel matrix obtained from the NDP1 and the NDP2, and wherein the P-matrix is a complex square matrix having positive principal minors.

16. The non-transitory computer-readable storage medium of claim 15, wherein the AP information fields further indicate whether each AP will transmit the BFRP trigger frame to solicit CSI reports from the STAs or whether an AP is able to receive a CSI report from another AP over a backhaul.

17. The non-transitory computer-readable storage medium of claim 11, wherein the information field indicating whether the sounding sequence type is for the JT channel sounding or the CBF channel sounding is a common information field.

18. The non-transitory computer-readable storage medium of claim 11, wherein the NDPA frame is further encoded to include a STA information fields for each of the STAs of the EHT group, wherein each STA information field is encoded to include an indicator indicating whether the sounding sequence type, for an associated STA of the EHT group, is for the JT channel sounding or the CBF channel sounding.

19. An apparatus of station (STA) configured for multi-AP coordinated beamforming (CBF) and multi-AP joint transmission (JT) in an Extremely High Throughput (EHT) wireless local area network (WLAN), the apparatus comprising: processing circuitry and memory, decode a null data packet announcement (NDPA) frame for multi-AP channel sounding, the NDPA received from an access point operating as a master AP (AP1) in a multi-AP network that includes a second AP (AP2) and one or more other stations (STAs) of an EHT group, the NDPA having an information field indicating whether a sounding sequence type is for JT channel sounding or CBF channel sounding, the NDPA further including fields identifying APs participating in the channel sounding including the AP1 and the AP2;

decode a first null data packet (NDP1) received from the AP1 and a second null data packet (NDP2) from the AP2, the NDP1 and the NPD2 comprising sounding sequences for either the JT channel sounding or the CBF channel sounding, the NDP1 and the NPD2 received via a plurality of spatial streams; and encode a channel state information (CSI) report frame for transmission to the AP1, wherein the CSI report frame includes channel state information determined by the STA based on both the NDP1 and the NDP2, wherein for the CBF channel sounding, the CSI report is determined by the STA separately for the NDP1 and the NDP2, and wherein for the JT channel sounding, the CSI report is determined by the STA from a combined reception of the NDP1 and the NDP2.

20. The apparatus of claim 19, wherein the NDPA frame indicate whether the AP1 will transmit a beam-forming refinement phase (BFRP) trigger frame solicit the CSI report from each of the STAs, the processing circuitry is further configured to:

decode the BFRP trigger frame to be received a short inter-frame spacing (SIFS) after the NDP1 to solicit the CSI report from the STA.

* * * * *